US 9,109,752 B2

(12) United States Patent
Kawai et al.

(10) Patent No.: US 9,109,752 B2
(45) Date of Patent: Aug. 18, 2015

(54) INTERNAL PRESSURE VESSEL

(75) Inventors: Yuichi Kawai, Joetsu (JP); Hiroshi Tanaka, Joetsu (JP); Youichi Toyooka, Joetsu (JP); Takahiro Iiyoshi, Joetsu (JP)

(73) Assignee: ARISAWA MFG. CO., LTD., Niigata (JP)

( * ) Notice: Subject to any disclaimer, the term of this patent is extended or adjusted under 35 U.S.C. 154(b) by 0 days.

(21) Appl. No.: 14/361,964

(22) PCT Filed: Sep. 7, 2012

(86) PCT No.: PCT/JP2012/072893
§ 371 (c)(1),
(2), (4) Date: May 30, 2014

(87) PCT Pub. No.: WO2013/080623
PCT Pub. Date: Jun. 6, 2013

(65) Prior Publication Data
US 2014/0339239 A1    Nov. 20, 2014

(30) Foreign Application Priority Data
Dec. 2, 2011   (JP) .................................. 2011-264541

(51) Int. Cl.
*F17C 1/06* (2006.01)
*B01D 63/00* (2006.01)
(Continued)

(52) U.S. Cl.
CPC . *F17C 1/06* (2013.01); *B01D 61/10* (2013.01); *B01D 63/00* (2013.01); *B29C 70/86* (2013.01); *F16J 12/00* (2013.01); *B01D 2313/20* (2013.01); *B01D 2313/21* (2013.01)

(58) Field of Classification Search
CPC ............... F17C 1/06; F17C 1/16; F16J 12/00; F16L 9/133; F16L 9/121; F16L 9/123; F16L 9/16; F16L 9/14; B65D 90/029
USPC .......... 220/590, 588, 589; 156/172, 173, 175; 428/34.6, 34.7, 36.3
See application file for complete search history.

(56) References Cited

U.S. PATENT DOCUMENTS 4,475,662 A    10/1984  Mandel
5,429,845 A     7/1995  Newhouse et al.
(Continued)

FOREIGN PATENT DOCUMENTS

JP    52-126515 A    10/1977
JP    58-106259 A     6/1983
(Continued)

OTHER PUBLICATIONS

English Translation of International Preliminary Report on Patentability for PCT/JP2012/072893 dated Jun. 12, 2014.
(Continued)

*Primary Examiner* — Andrew Perreault
(74) *Attorney, Agent, or Firm* — Sughrue Mion, PLLC

(57) ABSTRACT

Provided is a pressure vessel able to sustain a circular shape without deforming to ellipsoidal shape due to machining of side port apertures therein, and maintain pressures as high as 800-1,200 PSI. The pressure vessel is intended for use in seawater desalination by reverse osmosis, and comprises a pipe body (1) formed by filament winding (FW), and is furnished with an occluding cover (2) at each end of the pipe body (1), the peripheral surface of the pipe body being furnished, inward from the occluding covers (2), with inflow/outflow parts (3) through which the fluid flows in or out. The pipe body (1) is constituted by a helical layer (4), hoop layers, and a seal layer (6) furnished as the innermost layer. The helical layer (4) is furnished with a divergent part (7) diverging away from the seal layer (6) and extending from a location outward from the occluding cover (2) to a location inward from the inflow/outflow part (3). The hoop layers are constituted by a first hoop layer (8) furnished between the divergent part (7) and the seal layer (6), and a second hoop layer (9) furnished at the outer circumference of the helical layer (4), and extending from a location outward from the occluding cover (2) to a location inward from the inflow/outflow part (3).

15 Claims, 13 Drawing Sheets

(51) Int. Cl.
*F16J 12/00* (2006.01)
*B01D 61/10* (2006.01)
*B29C 70/86* (2006.01)

(56) References Cited

U.S. PATENT DOCUMENTS

| | | | |
|---|---|---|---|
| 7,413,098 B2 * | 8/2008 | Sugano et al. | 220/590 |
| 7,757,883 B2 * | 7/2010 | Gilbertson et al. | 220/590 |
| 2006/0000543 A1 | 1/2006 | Sugano et al. | |

FOREIGN PATENT DOCUMENTS

| | | |
|---|---|---|
| JP | 06-137433 A | 5/1994 |
| JP | 09-178097 A | 7/1997 |
| JP | 2000-015711 A | 1/2000 |
| JP | 2006-015573 A | 1/2006 |
| JP | 2008-535695 A | 9/2008 |
| JP | 4219862 B2 | 2/2009 |
| JP | 5400125 B2 | 1/2014 |
| WO | 2006/110754 A2 | 10/2006 |

OTHER PUBLICATIONS

International Search Report, PCT/JP2012/072893, dated Nov. 6, 2012.

Japanese Office Action of Notification of Reason(s) for Refusal, 2011-264541, dated Jun. 20, 2013.

* cited by examiner

|  |  | MATERIAL USED FOR VESSEL INNERMOST LAYER | | |
|---|---|---|---|---|
|  |  | POLYESTER NONWOVEN ONLY | GLASS NONWOVEN (GLASS PAPER) + POLYESTER NONWOVEN | GLASS NONWOVEN (GLASS PAPER ONLY) |
| WINDING METHOD | 1/4 LAP | LEAKAGE AT 16.5 Hr | NO LEAKAGE AT 48 Hr | NO LEAKAGE AT 48 Hr |
|  | 3/4 LAP | LEAKAGE AT 27.5 Hr | NO LEAKAGE AT 48 Hr | NO LEAKAGE AT 48 Hr |

FIG.11

| PIPE BODY INSIDE DIA. 8 IN. (φ 202 mm) SIDE PORT DIA. 3 IN. | AMOUNT OF ELLIPSOIDAL DEFORMATION (mm) | | | | | | |
|---|---|---|---|---|---|---|---|
| | COMP. EX. 1 | COMP. EX. 2 | COMP. EX. 3 | TEST EX. 1 | TEST EX. 2 | TEST EX. 3 |
| MEASURED VALUE | 0.62 | 0.81 | 0.96 | 0.05 | 0.12 | 0.22 |

FIG.12

| PIPE BODY INSIDE DIA. 10 IN. ($\phi$ 280 mm) SIDE PORT DIA. 4 IN. | AMOUNT OF ELLIPSOIDAL DEFORMATION (mm) | | | | | |
|---|---|---|---|---|---|---|
| | COMP. EX. 1 | COMP. EX. 2 | COMP. EX. 3 | TEST EX. 1 | TEST EX. 2 | TEST EX. 3 |
| MEASURED VALUE | 0.70 | 0.88 | 1.06 | 0.09 | 0.18 | 0.27 |

FIG.13

| PIPE BODY INSIDE DIA. 16 IN. (φ404 mm) SIDE PORT DIA. 6 IN. | AMOUNT OF ELLIPSOIDAL DEFORMATION (mm) | | | | | | |
|---|---|---|---|---|---|---|---|
| | COMP. EX. 1 | COMP. EX. 2 | COMP. EX. 3 | TEST EX. 1 | TEST EX. 2 | TEST EX. 3 |
| MEASURED VALUE | 0.82 | 0.97 | 1.18 | 0.20 | 0.29 | 0.35 |

INTERNAL PRESSURE VESSEL

CROSS REFERENCE TO RELATED APPLICATIONS

This application is a National Stage of International Application No. PCT/JP2012/072893 filed Sep. 7, 2012, claiming priority based on Japanese Patent Application No. 2011-264541 filed Dec. 2, 2011, the contents of all of which are incorporated herein by reference in their entirety.

TECHNICAL FIELD

The present invention relates to an internal pressure vessel.

BACKGROUND ART

In plant facilities for desalination of seawater by reverse osmosis membrane methods, it is common practice to employ a method of introducing seawater or the like into a pressure vessel (internal pressure vessel) loaded with a hollow fiber membrane or spiral membrane, and applying pressure to separate desalinated water from concentrated water (concentrated seawater).

In the course of such a reverse osmosis membrane method, the interior of the pressure vessel is continuously subjected to internal pressure of 800-1,200 PSI (5.5-8.3 MPa), which is 5.5-8.3 times the 1 MPA of compressed air generated by a typical compressor. Therefore, exceedingly high pressure resistance is required of pressure vessels. Moreover, because pressure vessels come into contact with seawater and concentrated seawater, typical practice is to employ fiber-reinforced plastics (FRP), which are endowed with good corrosion resistance and pressure resistance.

Filament winding (FW), by which high pressure resistant qualities can be designed, has been adopted as the method for molding FRP.

It is widely known that in general, the mechanical characteristics of FRP are greatly affected by the orientation of the fibers thereof. For example, while a high level of pressure resistance is obtained when tensile load is applied in the lengthwise direction (X direction) of the fibers of an FRP, a high level of pressure resistance is not obtained when tensile load is applied in the width direction (Y direction) of the fibers of the FRP. This characteristic is termed anisotropy, and differs greatly from isotropic materials such as metals.

In order for an FRP produced by FW to utilize isotropy and retain internal pressure, it is preferable during fabrication of the pipe body for the angle during winding of the filaments (glass fibers) onto a mandrel to be set to 55 degrees (50 degrees to 60 degrees, depending on the method of calculation) with respect to the direction of the axial center of the mandrel. In FW, such a fiber layer in which the winding angle of the fibers is inclined with respect to the direction of the axial center is termed a helical layer (see FIG. 1. FIG. 1 shows an example of the case of a helical angle of 55 degrees).

In order to avoid a situation in which there is pressure resistance in the circumferential direction only, and no pressure resistance in the lengthwise direction (for example, when pressure is applied to an FRP pressure vessel, no change is observed in the circumferential direction, but stretching is observed in the lengthwise direction. This can occur, for example, in cases in which the winding angle is close to 90° C.; see FIG. 2), or in which there is pressure resistance in the lengthwise direction only, and no pressure resistance in the circumferential direction (for example, when pressure is applied to an FRP pressure vessel, no change is observed in the lengthwise direction, but the inside diameter stretches in the circumferential direction. This can occur, for example, in cases in which the winding angle is close to 0° C.; see FIG. 3), it is preferable for the winding angle of the fibers that form the helical layer to be one that affords a balance between pressure resistance with respect to pressure in the circumferential direction of the pressure vessel, and pressure resistance in the lengthwise direction (direction of the axial center).

In pressure vessels produced by simple FW, the pipe body is fabricated by winding fibers into layers (helical layers) at this angle of 55 degrees. When internal pressure is applied to this pipe body, the occluding covers 2 at either end of the pipe body, which have been provided at either end of the pressure vessel, are subjected to large loads (forces tending to push the occluding covers towards the outside of the pipe body due to internal pressure).

When internal pressure is applied to a pressure vessel, the force thereof is transmitted to retainer rings 53 that fasten together the occluding covers 52 and the pipe body 51 at either end of the pipe body 51 (see FIG. 4). Because the vector of this force is directed parallel to the direction of the axial center of the pipe body, the force acts in such a way that FRP layers at the front surface of the retainer rings of the pipe body 51 are pushed towards the outside of the pipe body by the retainer rings 53, in a direction parallel to the axial center. This force acts as interlayer shear force in the circumferential direction on the respective layers, in each of FRP layers wound into layers at 55 degrees and FRP layers wound into layers at 90 degrees, resulting in rupture of the FRP layers at the front surface of the retainer rings (see FIG. 5).

In the case of a pressure vessel of the above structure, in order to maintain high pressures of 800-1,200 PSI (5.5-8.3 MPa), there could be adopted either a method of increasing the thickness of the layered wound layers (increased rigidity), or adopting a greater distance from the retainer rings to the ends of the pipe body to increase the shear distance (increased shear force); however, either of these will result in a heavier pressure vessel.

In a pressure vessel, the barrel section of the pipe body 51 is rigid, and in many cases, the pressure resistance thereof to pressure is dependent upon the pressure resistance of the FRP layers surrounding the retainer rings.

According to American Society of Mechanical Engineers (ASME) Section X, which is the technical standard in the field, the internal pressure-induced rupture pressure (safety factor) is specified as being 6 or more times higher than the operating pressure. In an FRP pressure vessel, design of fiber orientation (design of anisotropy) in this section has a large effect on whether a pressure vessel is good or bad.

When pressure is applied to a pressure vessel, there is accompanying deformation in the circumferential direction in the surrounding areas of the occluding covers 52, and therefore in many instances, wound fiber layers (hoop layers) at 90 degrees with respect to the axial center are furnished only in the surrounding areas of the retainer rings, increasing the thickness of the pipe body in these sections. For this reason, most FRP pressure vessels for seawater desalination purposes are larger in diameter at both ends, like a dumbbell.

In particular, as the force arising from tensile rupture of FRP layers affords considerably greater pressure resistance as compared with the force arising from shear rupture of FRP layers, a pressure vessel employing a FW method like that disclosed, for example, in Patent Document 1 has been proposed, in order to meet the safety factor requirements in the aforementioned ASME Section X. Patent Document 1 discloses a structure furnished, in zones at either end of an inner ring, with hoop layers wound in the circumferential direction about a mandrel, and in other zones with helical layers wound at an acute angle with respect to the axial center of the mandrel (see FIG. 1 of Patent Document 1) (additional hoop layers being furnished, only at both ends of the aforementioned helical layer).

PRIOR ART DOCUMENTS

Patent Documents

[Patent Document 1] Japanese Patent No. 4219862

DISCLOSURE OF THE INVENTION

Problems the Invention Attempts to Solve

In recent years, it has become common to utilize so-called multi-port type pressure vessels like that illustrated in FIG. 4, in which large openings are furnished at the 12-o'clock and 6-o'clock positions of the lateral cross section at either end of the pressure vessel; pipe members 55, termed side ports, are arranged in these opening sections; and seawater is supplied into the pressure vessel from the side ports at one end, while concentrated seawater produced through desalination of seawater by reverse osmosis is discharged from the side ports at the other end. Such multi-port type pressure vessels have become rapidly widespread, due to the advantageous effect that the pressure vessel can be endowed with seawater supply and concentrated seawater discharge functions, reducing the number of metal pipes, which are prone to rusting.

The larger the openings (side port apertures) are at the 12-o'clock and 6-o'clock positions at either end of a multi-port type pressure vessel, the greater the flow of seawater and concentrated seawater through the vessel will be. Nowadays, some nominal 8-inch pressure vessels (pipe body inside diameter: 202 mm) and nominal 11-inch pressure vessels (pipe body inside diameter: 280 mm) are furnished at either end with 4-inch (101.6 mm) openings.

As mentioned above, FRP is anisotropic and endowed with high pressure resistance due to linkage of the fibers, and moreover maintains a cross section of circular shape. However, if the fibers in the FRP become severed in the course of machining of the side port apertures, shape retaining power will be lost in those sections. Furthermore, the larger the size of the side port apertures is in relation to the diameter of the pipe body, the more difficult it is to maintain the shape. In specific terms, when 4-inch side port apertures are machined at the 12-o'clock and 6-o'clock positions in a pressure vessel of 8-inch inside diameter, the lateral cross section in these sections deforms to an ellipsoidal shape in which the minor axis extends from the 12-o'clock to the 6-o'clock position, and the major axis from the 3-o'clock to the 9-o'clock position (see FIG. 6). A similar phenomenon is observed in a pressure vessel of 11-inch inside diameter into which 2.5-inch (63.5 mm) side port apertures have been machined.

In cases in which the lateral cross section of the tube body has deformed to an ellipsoidal shape due to machining of the side port apertures in this way, there no longer sufficient contact between the inner wall surface of the pipe body and water seals 54 (for example, O-rings of circular cross section, or quad rings of X-shaped cross section) furnished to the occluding covers.

In specific terms, the lateral cross section of the water seal zones of the pipe body 51 is ellipsoidal, whereas the lateral cross section of the occluding cover 52 is round, resulting in a circular shape being contacted by an ellipsoidal shape. Thus, particularly in the major axis sections of the ellipse, differences arise between the diameter of the circle and that of the ellipse, and water leaks (pressure leaks) occur from these sections, resulting in loss of functionality of the pressure vessel for desalination of seawater.

Specifically, sealing properties and pressure resistance in the vicinity of the occluding covers of a pressure vessel are crucial in pressure vessels for desalination of seawater by reverse osmosis.

While Patent Document 1 discloses a structure and a configuration that afford high pressure resistance to internal pressure, no consideration has been given to ellipsoidal deformation arising due to openings at either end of the pipe body.

Sealing properties and pressure resistance are required not just in the vicinity of the occluding covers at either end of a pressure vessel; sealing properties and pressure resistance are likewise required in the barrel section of the pressure vessel as well (generally speaking, the interval from the seal 54 of the occluding cover 52 at one end to the seal 54 of the occluding cover 52 at the other end).

Specifically, as mentioned above, the winding angle of the helical layer is 55 degrees in order to maintain internal pressure in the pressure vessel, and while glass fibers and a matrix resin (for example, an epoxy resin or unsaturated ester resin) do by themselves afford resistance to pressure, it is extremely difficult to avoid leaking of the liquid inside the pressure vessel (for example, seawater, concentrated seawater, or water generated through reverse osmosis).

FRP are constituted of fibers and resins, which may appear uniform when viewed macroscopically, but viewed microscopically, are seen to be present in discrete fashion. When an FRP is viewed microscopically, it is observed that interstices between fibers are filled with resin. However, in cases in which even miniscule voids are present between fibers, these voids can function as portals through which leakage of contained liquid can occur. In actual practice, the void content of FRP is on the order of 1-2%, and in cases in which these voids are present on the inner surface of a pressure vessel, there is ample likelihood of the voids functioning as portals for leakage of the contained liquid.

As noted above, in the drum section of a pressure vessel, when the winding angle of the helical layer is 55 degrees, the ability to maintain pressure (internal pressure resistance) is sufficient, but the ability to prevent leakage of fluids to the outside from inside the pressure vessel (sealing properties) is not sufficient in all aspects. Naturally, of fibers of the 55-degree winding angle helical layer, any fiber and adjacent fibers will be at 55 degrees. Therefore, in cases in which there are defects of the pressure vessel inner surface (for example, in cases in which void sections between fibers are present on the pressure vessel inner surface), fluids inside the pressure vessel (for example, in the case of seawater desalination, seawater or concentrated seawater) can infiltrate into the defects, and, in tandem with the pressure applied to the fluid, can gradually erode the interfaces of the resin and fibers oriented at 55 degrees (erosion in the 55 degree direction), ultimately leading to "fluid leaks."

Specifically, once portals for leaks have formed, like water seeping through a mountain, water passages form towards the pressure vessel surface over an extended period of time, leading to leakage of the contained liquid. Leakage of contained liquid not only undermines the pressure maintenance function of the pressure vessel, but can also lead to salt-containing liquids (seawater or concentrated seawater) becoming dispersed through the seawater desalination plant (dispersed in the form of a fountain, due to the applied internal pressure), thereby giving rise to the significant problem of corrosion of surrounding equipment. In actual practice, in seawater desalination plants, some pressure vessels do not leak at startup, but experience leakage in as short a time as 3 to 6 months later, or in longer instances, after 2 to 3 years.

Specifically, sealing properties and internal pressure resistance in the barrel section of a pressure vessel is likewise a crucial function in pressure vessels for seawater desalination by reverse osmosis.

With the foregoing in view, it is an object of the present invention to provide an eminently practicable pressure vessel which affords improved sealing properties and internal pressure resistance in the barrel section of a pressure vessel and in sections thereof in proximity to occluding covers, and which can sustain a circular shape without deforming to ellipsoidal shape due to machining of side port apertures therein, so as be able to maintain pressures as high as 800-1,200 PSI.

Means for Solving the Problem

The present invention will be summarized with reference to the accompanying drawings.

The present invention relates to a pressure vessel for use in seawater desalination or water purification by reverse osmosis, comprising a pipe body 1 formed by winding into layers continuous fibers by filament winding, wherein the pressure vessel is characterized by being furnished, at each end in the pipe body axial direction of the pipe body 1, with an occluding cover 2 for occluding the pipe body 1, the peripheral surface of the pipe body 1 being furnished, inward from the occluding cover 2 in the pipe body axial direction, with an inflow/outflow part 3 through which fluid flows in or out from the peripheral surface of the pipe body 1, the pipe body 1 being constituted by a helical layer 4 formed by helical winding of fibers, hoop layers formed by hoop winding of fibers, and a seal layer 6 furnished as the innermost layer, the helical layer 4 being furnished, at each end in the pipe body axial direction of the pipe body 1, with a divergent part 7 diverging outward from the seal layer 6 in the circumferential direction, and extending from at least a location outward from the occluding cover 2 in the pipe body axial direction to a location inward from the inflow/outflow part 3 in the pipe body axial direction, the hoop layers being constituted by a first hoop layer 8 furnished between the seal layer 6 and the divergent part 7 of the helical layer 4, and a second hoop layer 9 furnished at the outer circumference of the helical layer 4, and extending from a location outward from the occluding cover 2 in the pipe body axial direction to a location inward from the inflow/outflow part 3 in the pipe body axial direction.

The present invention further relates to the pressure vessel according to the first aspect, wherein the pressure vessel is characterized in that the seal layer 6 comprises a base material having a randomly isotropic fiber orientation, and a matrix resin identical to the matrix resin of the helical layer 4 and the hoop layers.

The present invention further relates to the pressure vessel according to the second aspect, wherein the pressure vessel is characterized in that the resin content of the seal layer 6 is greater than the resin content of the helical layer 4 and the hoop layers.

The present invention further relates to the pressure vessel according to the third aspect, wherein the pressure vessel is characterized in that the resin content of the seal layer 6 is set to 40-85 wt %, and the resin content of the helical layer 4 and the hoop layers is set to 20-30 wt %.

The present invention further relates to the pressure vessel according to the second aspect, wherein the pressure vessel is characterized in that the seal layer 6 includes a layer comprising a glass nonwoven and the matrix resin.

The present invention further relates to the pressure vessel according to the second aspect, wherein the pressure vessel is characterized in that the seal layer 6 is constituted by a first seal layer 10 comprising a glass nonwoven and the matrix resin, and a second seal layer 11 comprising a polyester nonwoven and the matrix resin.

The present invention further relates to the pressure vessel according to the second aspect, wherein the pressure vessel is characterized in that the seal layer 6 is formed by continuous winding of a base material of tape form onto a mandrel.

The present invention further relates to the pressure vessel according to the fifth aspect, wherein the pressure vessel is characterized in that the seal layer 6 is formed by continuous winding of a base material of tape form onto a mandrel.

The present invention further relates to the pressure vessel according to the sixth aspect, wherein the pressure vessel is characterized in that the seal layer 6 is formed by continuous winding of a base material of tape form onto a mandrel.

The present invention further relates to the pressure vessel according to the first aspect, wherein the pressure vessel is characterized in that the helical layer 4, in sections thereof other than the divergent part 7, contacts the seal layer 6.

The present invention further relates to the pressure vessel according to the fifth aspect, wherein the pressure vessel is characterized in that the helical layer 4, in sections thereof other than the divergent part 7, contacts the seal layer 6.

The present invention further relates to the pressure vessel according to the sixth aspect, wherein the pressure vessel is characterized in that the helical layer 4, in sections thereof other than the divergent part 7, contacts the seal layer 6.

The present invention further relates to the pressure vessel according to the seventh aspect, wherein the pressure vessel is characterized in that the helical layer 4, in sections thereof other than the divergent part 7, contacts the seal layer 6.

The present invention further relates to the pressure vessel according to the eighth aspect, wherein the pressure vessel is characterized in that the helical layer 4, in sections thereof other than the divergent part 7, contacts the seal layer 6.

The present invention further relates to the pressure vessel according to the ninth aspect, wherein the pressure vessel is characterized in that the helical layer 4, in sections thereof other than the divergent part 7, contacts the seal layer 6.

Effect of the Invention

The constitution of the present invention set forth above affords an eminently practicable pressure vessel able to sustain a circular shape without deforming to ellipsoidal shape due to machining of side port apertures therein, and able to maintain pressure as high as 800-1,200 PSI.

BRIEF DESCRIPTION OF THE DRAWINGS

FIG. 11 is a table showing test results;

FIG. 12 is a table showing test results; and

FIG. 13 is a table showing test results.

BEST MODE FOR CARRYING OUT THE INVENTION

Figure 1:
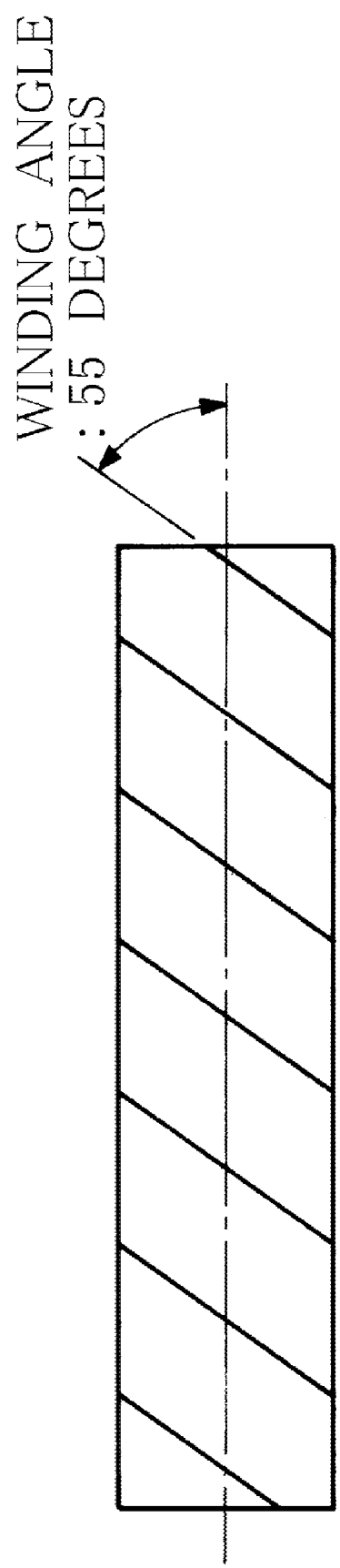
FIG. 1 is a simplified diagram of the preferred winding angle (fiber angle) of the helical layer.

Preferred embodiments of the present invention are described briefly below on the basis of the drawings, to show the working effect of the present invention.

The divergent part 7 of the helical layer 4 is maintained in a state of divergence (uplifted state) by the first hoop layer 8 and the second hoop layer 9, whereby the strength thereof is sustained not only by interlayer shear force, but also by force tending to divide the fibers of the helical layer 4, making it possible to improve the pressure resistance of the pressure vessel in the sections thereof in proximity to the occluding covers, and to do so without making the pipe body 1 larger or heavier.

The structure is one in which the helical layer 4 is sandwiched by the hoop layers 8, 9 employed to sustain the circular shape of the pipe body 1, whereby the circular shape of the pipe body 1 can be sustained by the first hoop layer 8 and the second hoop layer 9 even when fibers are severed in the course of machining the apertures of the inflow/outflow parts 3 (machining of side port apertures). Due to the presence of the divergent part 7 in the helical layer 4, each end of the helical layer 4 has an arcuate shape in longitudinal cross sectional view, and this feature also helps to prevent ellipsoidal deformation caused by machining of the apertures of the inflow/outflow parts 3. Therefore, loss of sealing properties in proximity to the occluding covers 2 due to machining of side port apertures can be prevented.

The seal layer 6 is one composed of a base material having a randomly isotropic fiber orientation, and a matrix resin identical to the matrix resin of the helical layer 4 and the hoop layers. For example, by adopting a constitution that includes a layer of a glass nonwoven and epoxy resin, a robust waterproof layer can be formed by the innermost layer. Good sealing properties in the vessel barrel may be obtained thereby.

EMBODIMENTS

Specific embodiments of the present invention will be described on the basis of the drawings.

The present embodiment is a pressure vessel pressure vessel for use in seawater desalination or water purification by reverse osmosis, which is composed of a pipe body 1 formed by winding into layers continuous fibers by filament winding, and which is furnished, at each end in the pipe body axial direction of the pipe body 1, with an occluding cover 2 for occluding the pipe body 1, the peripheral surface of the pipe body 1 being furnished, inward from the occluding cover 2 in the pipe body axial direction, with inflow/outflow parts 3 through which fluid flows in and out from the peripheral surface of the pipe body 1, the pipe body 1 being constituted by a helical layer 4 formed by helical winding of fibers, hoop layers formed by hoop winding of fibers, and a seal layer 6 furnished as the innermost layer, the helical layer 4 being furnished, at each end in the pipe body axial direction of the pipe body 1, with a divergent part 7 diverging outward from the seal layer 6 in the circumferential direction, from at least a location outward from the occluding cover 2 in the pipe body axial direction to a location inward from the inflow/outflow part 3 in the pipe body axial direction, the helical layer 4 being furnished in such a way as to contact the seal layer 6 at both the inner and outer sides of the divergent part 7, the hoop layers being furnished only at either end of the pipe body 1, with the hoop layers being constituted by a first hoop layer 8 furnished between the seal layer 6 and the divergent part 7 of the helical layer 4, and a second hoop layer 9 furnished at the outer circumference of the helical layer 4, from a location outward from the occluding cover 2 in the pipe body axial direction to a location inward from the inflow/outflow part 3 in the pipe body axial direction.

In specific terms, the pipe body 1 of the present embodiment has a circular cylindrical shape formed by continuously winding the required amount of glass fibers impregnated with a resin containing an epoxy resin and a curing agent therefor, onto a mandrel of circular cylindrical shape (on which a layer serving as the seal layer 6, discussed later, has been formed) at a predetermined incline angle with respect to the axial direction of the mandrel (the axial direction of the pipe body 1) by a known filament winding method, doing so in the axial direction of the mandrel, thermally curing the epoxy resin, then demolding from the mandrel. The pipe body 1 is intended for use in seawater desalination or water (ultra) purification treatment.

In specific terms, a base material of tape form having randomly isotropic fiber orientation is wound continuously onto the mandrel, onto a predetermined area of the mandrel coextensive with the entire area of pipe body 1 in the axial direction, doing so in such a way as to produce overlap by a predetermined lap (in a range of from ¼ to ¾) at the ends, while impregnating the material with a matrix resin, to form a resin-impregnated layer constituting the seal layer 6. The helical layer 4, and the resin-impregnated layers constituting the hoop layers, are then provided over the resin-impregnated layer constituting the seal layer 6.

According to the present embodiment, a resin-impregnated layer constituting a first seal layer 10 obtained by continuously winding glass nonwoven continuously onto the mandrel while impregnating an epoxy resin is provided, and then a resin-impregnated layer constituting a second seal layer 11 obtained by continuously winding polyester nonwoven continuously onto the mandrel while impregnating an epoxy resin is provided.

In the aforedescribed example, the innermost layer is a seal layer employing glass nonwoven; however, a constitution in which the polyester nonwoven is wound first, and the glass nonwoven is wound thereafter, is also acceptable (it is acceptable to have a seal layer employing polyester nonwoven as the innermost layer). Additionally, it is acceptable to adopt nonwovens made of other organic fibers, in place of polyester nonwoven.

Figure 10:
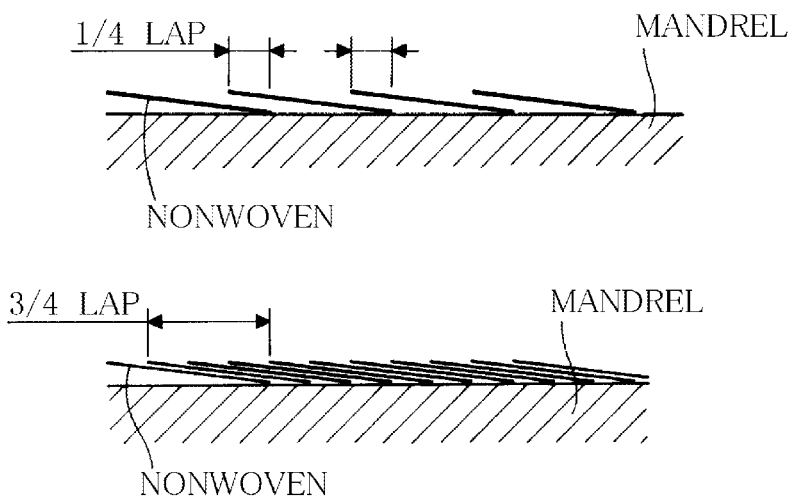
FIG. 10 is an explanatory diagram of test results relating to the seal layer of the present embodiment.

The results of tests of waterproof properties (sealing properties) obtained with different seal layer structures of the innermost layer are shown in FIG. 10. In cases in which a layer having glass nonwoven as the base material is included, waterproof properties are better as compared to cases in which the base material is polyester nonwoven. Moreover, a ¾ lap affords better waterproof properties than in the case of a ¼ lap, because the seal layer can be made thicker. Consequently, a seal layer including at least glass nonwoven as the base material, and formed by wrapping in a such way that the ends overlap by a ¾ lap, affords exceptionally superior waterproof properties.

In general, treatment techniques for glass fiber surfaces are highly developed, and good adhesion between fiber surfaces and epoxy resins can be achieved; however, with organic fibers such as polyester, factors such as the water content thereof can inhibit the curing reaction (crosslinking or polymerization reaction) of the epoxy resin, and therefore adhesion between fiber surface and epoxy resins is considered difficult to achieve. Moreover, as exemplified by fleece, polyester fibers have the characteristic of higher bulk for a given weight, and as such can contain more resin (they have the quality that resin can be contained in the voids of the high-bulk material). By combining glass nonwoven and polyester nonwoven, these materials can compensate for the drawbacks of the other. By adopting such combinations (combinations of glass nonwovens and polyester nonwovens), a glass fiber layer having good adhesion between the epoxy resin and the glass fibers can be combined with a polyester nonwoven capable of containing a greater amount of resin than the glass nonwoven, to obtain a good seal layer (a waterproof layer against water leaks).

Next, a resin-impregnated layer serving as the first hoop layer 8 is formed by hoop winding at an angle of 85-89 degrees with respect to the axial direction of the mandrel, doing so from the outer end (of the predetermined location for situating) the occluding cover 2, to a location a predetermined distance away from the inner end (of the predetermined location for situating) the inflow/outflow parts 3, and then a resin-impregnated layer serving as the helical layer 4 is formed by helical winding at 50-60 degrees throughout the entire area of the pipe body 1 in the axial direction. Next, a resin-impregnated layer serving as the second hoop layer 9 is formed by hoop winding at an angle of 85-89 degrees, from a location at the end of the pipe body 1 in the pipe body axial direction, to a location inward from the inner end of the first hoop layer 8 (a location inward from the zone in which the divergent helical layer 4 contacts the seal layer 6). Thereafter, the resin-impregnated layers are thermally cured, and the mandrel core is withdrawn (demolding) to obtain the pipe body 1.

There is no limitation herein to epoxy resins, and other resins, such as polyester resins, vinyl ester resins, or the like may be employed; nor is there any limitation herein to glass fibers, and other fibers, such as carbon fibers or the like, may be employed. In preferred practice, a resin identical to the matrix resin of the helical layer 4 and the hoop layers will be adopted as the matrix resin of the seal layer 6, as doing so improves cohesion. The start point of the first hoop layer 8 may be a location a predetermined distance away from the outer end of the occluding cover 2, and the end point thereof may be a location at the inner end of the inflow/outflow parts 3 (and set at locations at which the surrounding area of the aperture does not deform during machining of the apertures of the inflow/outflow parts 3).

In the present embodiment, the resin content of the seal layer 6 (the first seal layer 10 and the second seal layer 11) subsequent to thermal curing is set to 40-85 wt %, and the resin content of the helical layer 4 and the hoop layers (the first hoop layer 8 and the second hoop layer 9) is set to 20-30 wt %. In so doing, the waterproof properties (sealing properties) of the seal layer 6 are even better.

Figure 7:
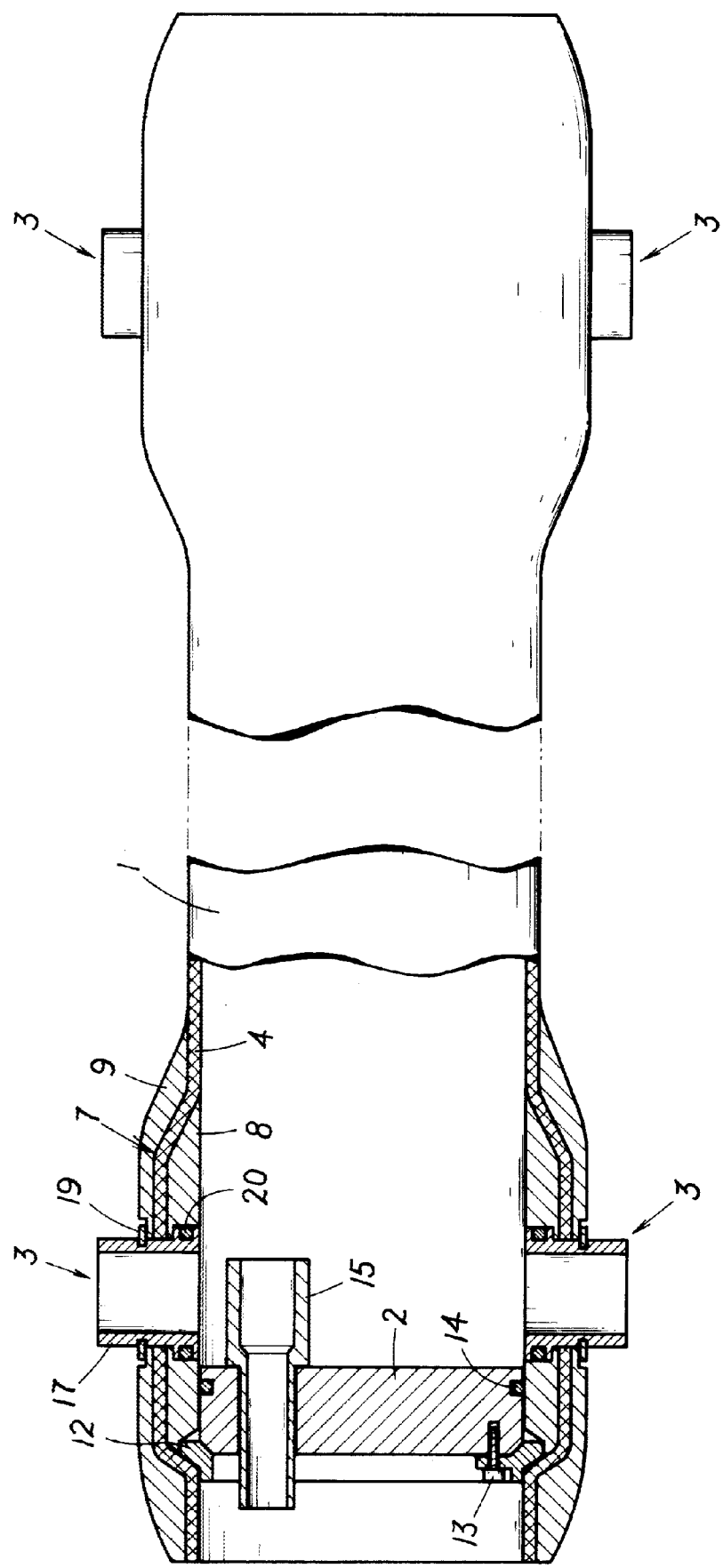
FIG. 7 is a simplified illustrative side view in which the present embodiment is partially cut away.
Figure 8:
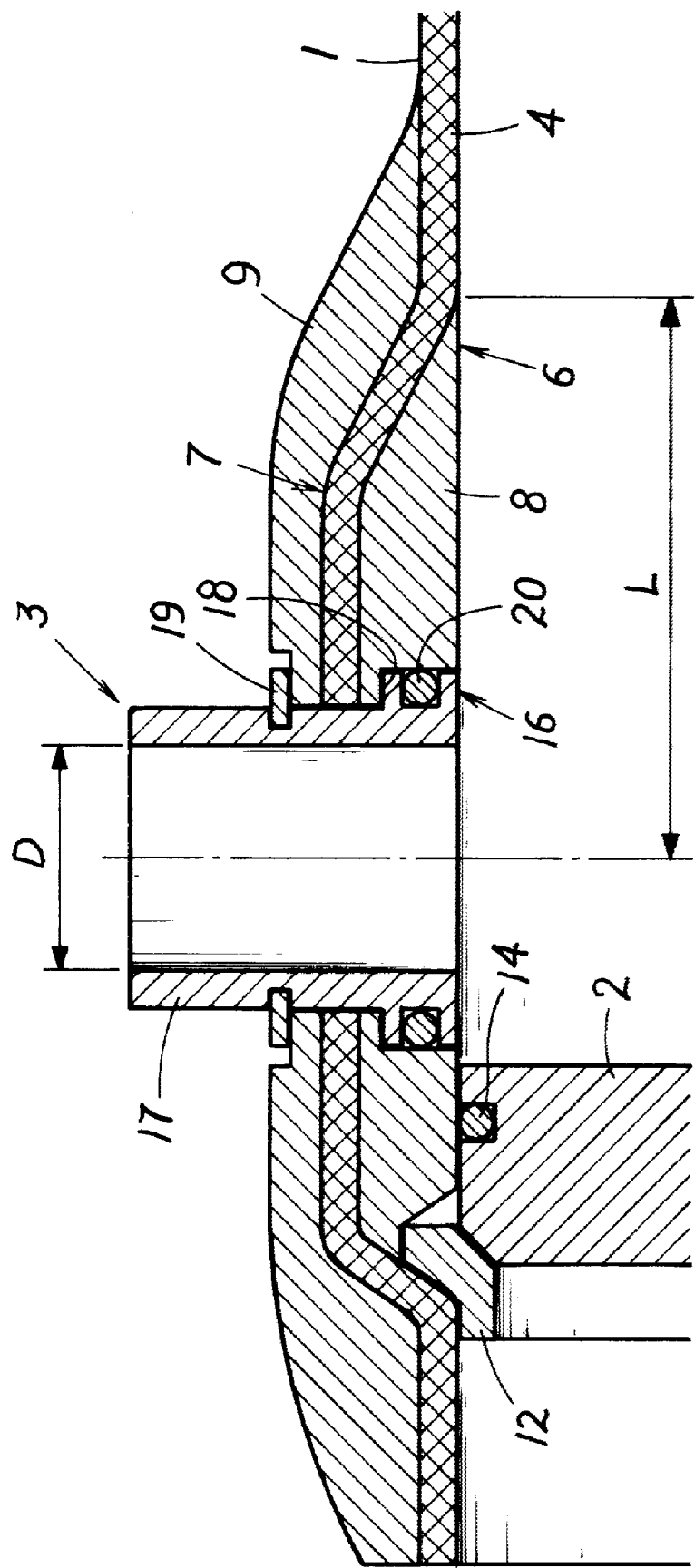
FIG. 8 is a fragmentary enlarged simplified illustrative cross sectional view of the present embodiment.

As shown in FIGS. 7 and 8, each end of the pipe body 1 is occluded by the occluding cover 2 which is made of fiber reinforced plastic (FRP) approximately equal in diameter to the inside peripheral surface of the pipe body 1, by joining it with bolts 13 to the retainer ring 12 made of FRP arranged in a recess which has been provided on the inside peripheral surface of the pipe body 1. In the drawings, symbol 14 denotes an O-ring for occlusion between the occluding cover 2 and the inside peripheral surface of the pipe body 1 passage hole, and 15 denotes a communicating aperture for communication between the inside and outside of the pipe body 1.

The recesses which are provided on the inside peripheral surface of the pipe body 1 for arrangement of the retainer rings 12 therein may be furnished simply by cutting into the inside peripheral surface of the pipe body 1 (the first hoop layer 8) to form recessed slots; or during winding of the fibers, ring elements or the like may be fitted onto the mandrel beforehand, so that the recesses for arrangement of the retainer rings 12 therein are formed on the inside peripheral surface by the ring elements. In cases in which the recessed slots are formed by cutting, the first hoop layer 8 should be provided with a shape such that the helical layer 4 will not be cut.

The inflow/outflow parts 3 (side ports) are disposed adjacently at locations inward from the occluding covers 2 in the axial direction of the pipe body 1. In specific terms, the inflow/outflow parts 3 are composed of inflow/outflow apertures bored through the peripheral surface of the pipe body 1, and cylindrical elements 17 furnished to the inflow/outflow apertures, and having a flange part 16 at one end. The flange part 16 of the cylindrical element 17 engages a step part 18 furnished to the inside peripheral surface of the pipe body 1. In the drawings, symbol 19 denotes a snap ring for engagement of the cylindrical element 17 by the pipe body 1, and 20 denotes an O-ring.

Figure 9:
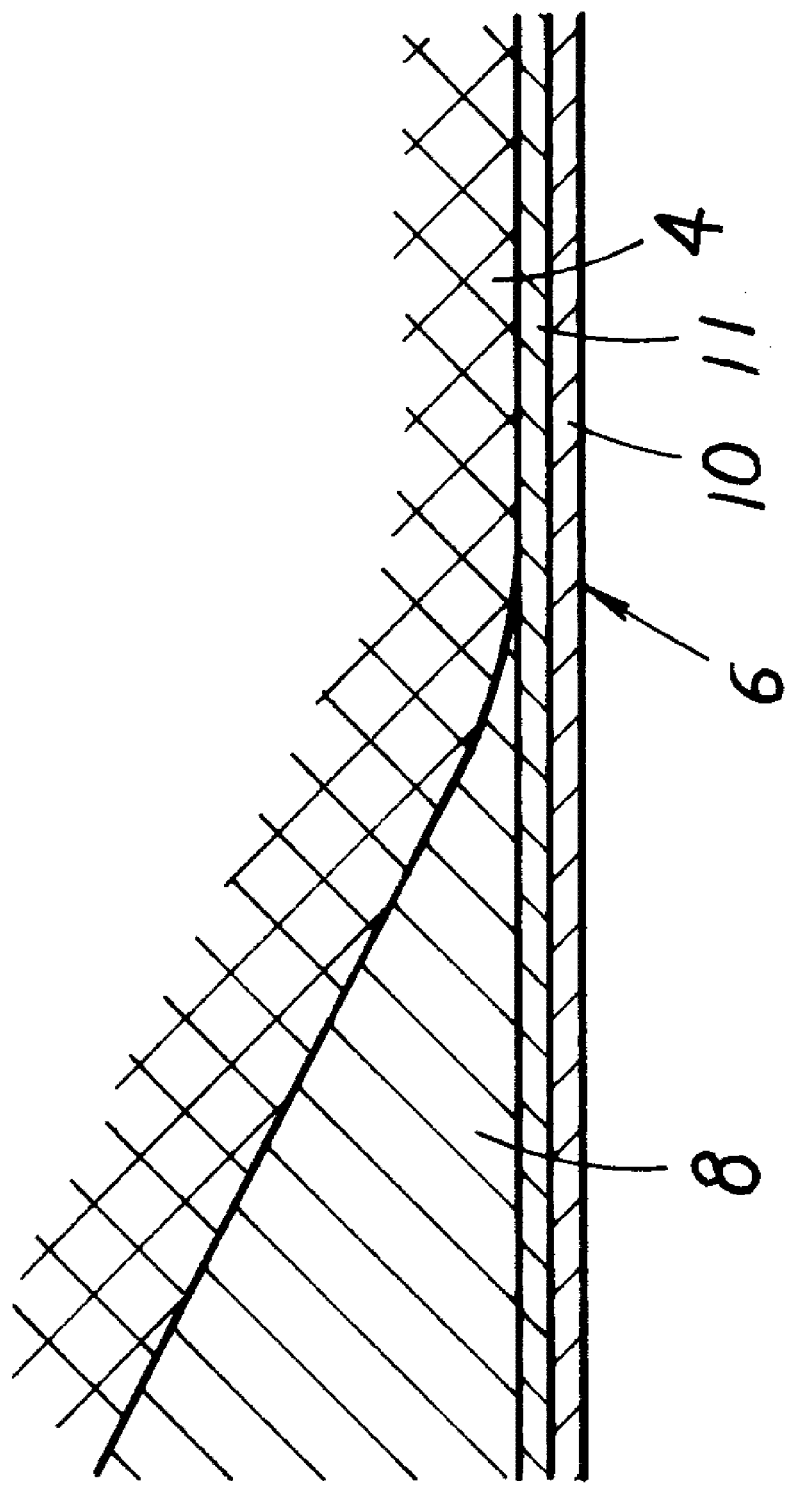
FIG. 9 is an enlarged simplified illustrative cross sectional view of the seal layer of the present embodiment.

Consequently, as shown in FIGS. 8 and 9, according to the present embodiment, the helical layer 4 diverges (inflects away) outwardly in the circumferential direction (outwardly in a radial direction) from the seal layer 6 at a location in proximity to the adjacently disposed occluding cover 2 and the inflow/outflow parts 3, producing a shape that bends (uplifts) into an arch, while contacting the seal layer 6 (the second seal layer 11) in portions thereof other than the divergent part 7.

The helical layer 4 at each end thereof is sandwiched by the first hoop layer 8 and the second hoop layer 9 (in a so-called sandwich structure), maintaining the arcuate shape of the divergent part 7 of the helical layer 4, whereby in addition to the effect of the two hoop layers surrounding the inflow/outflow part 3 in terms of maintaining a circular shape, the helical layer 4 becomes resistant to ellipsoidal deformation, and sustains its circular shape in satisfactory fashion despite machining of the apertures for the inflow/outflow parts 3 (because of the sandwich structure produced by the first hoop layer 8 and the second hoop layer 9, the circular shape of the lateral cross section characteristic of the hoop layers is sustained). Therefore, the O-ring 14 of the occluding cover 2 exhibits its waterproofing effect in satisfactory fashion. Additionally, the rise angle at either end of the divergent part 7 of the helical layer 4 is set to 90 degrees or less.

The inner end of the first hoop layer 8 (the divergent part 7) is preferably set at a location as far as possible away from the inflow/outflow parts 3. In specific terms, in the case of a pipe body 1 inside diameter of 8, 10, or 16 inches, irrespective of this inside diameter, a distance L from the port center to the inner edge of the first hoop layer 8 (the divergent part 7) is established according to the inside diameter D of the cylindrical element 17 of the inflow/outflow part 3 (port inside diameter). For example, in the case that D is 1.5 inches, L is 70 mm; in the case that D is 2 inches, L is 100 mm; in the case that D is 3 inches, L is 150 mm; in the case that D is 4 inches, L is 200 mm; in the case that D is 6 inches, L is 300 mm; and in the case that D is 8 inches, L is 400 mm. Consequently, L may be set to 50 mm or greater, per 1 inch of D.

Due to the aforedescribed constitution of the present invention, the divergent part 7 of the helical layer 4 is maintained in a state of divergence (uplifted state) by the first hoop layer 8 and the second hoop layer 9, whereby the strength thereof is sustained not only by interlayer shear force, but also by force tending to divide the fibers of the helical layer 4, making it possible to improve the pressure resistance of the pressure vessel in the sections thereof in proximity to the occluding covers, and to do so without making the pipe body 1 larger or heavier.

The structure is one in which the helical layer 4 is sandwiched by the hoop layers 8, 9 employed to sustain the circular shape of the pipe body 1, whereby the circular shape of the pipe body 1 can be sustained by the first hoop layer 8 and the second hoop layer 9, even when fibers are severed in the course of machining the apertures of the inflow/outflow parts 3 (side ports). Due to the presence of the divergent part 7 in the helical layer 4, each end of the helical layer 4 has an arcuate shape in longitudinal cross sectional view, and this feature also helps to prevent ellipsoidal deformation caused by machining of the apertures of the inflow/outflow parts 3, as well as providing a structure for the retainer rings to be gripped and detained by the helical layer 4 (a structure similar to grasping a flat dish with both hands), giving rise to force for maintaining internal pressure in the axial direction of the pipe body. Therefore, loss of sealing properties in proximity to the occluding covers 2 due to machining of side port apertures can be prevented, and internal pressure resistance can be ensured.

Specifically, according to the present invention, due to the presence of the hoop layers (the first hoop layer 8 and the second hoop layer 9, and additionally the sandwich structure of the two), even if fibers are severed during machining of the side port apertures, the circular shape of the lateral cross section is sustained, and internal pressure resistance in the circumferential direction is ensured. Furthermore, by uplifting the helical layer, internal pressure resistance in the lengthwise direction is ensured by a structure whereby the retainer rings which constitute the pressure support parts are gripped and detained in the pipe body. In so doing, it is possible to compensate for certain drawbacks of pressure vessels made of FRP, namely, of having pressure resistance in the circumferential direction only, while lacking pressure resistance in the lengthwise direction, or of having pressure resistance in the lengthwise direction only, while lacking pressure resistance in the circumferential direction, whereby, for example, the FRP pressure vessel, when subjected to pressure, is unchanged in the lengthwise direction, while the inside diameter expands in the circumferential direction.

By adopting as the seal layer 6 a constitution that includes a layer of glass nonwoven and epoxy resin, a rigid waterproof layer is formed by the innermost layer, affording good sealing properties in the barrel of the vessel.

Therefore, the present embodiment affords an eminently practicable pressure vessel able to sustain a circular shape without deforming to ellipsoidal shape due to machining of side port apertures therein, and able to maintain pressure as high as 800-1,200 PSI.

Test examples supporting the advantageous effects of the present embodiment will be described.

Figure 2:
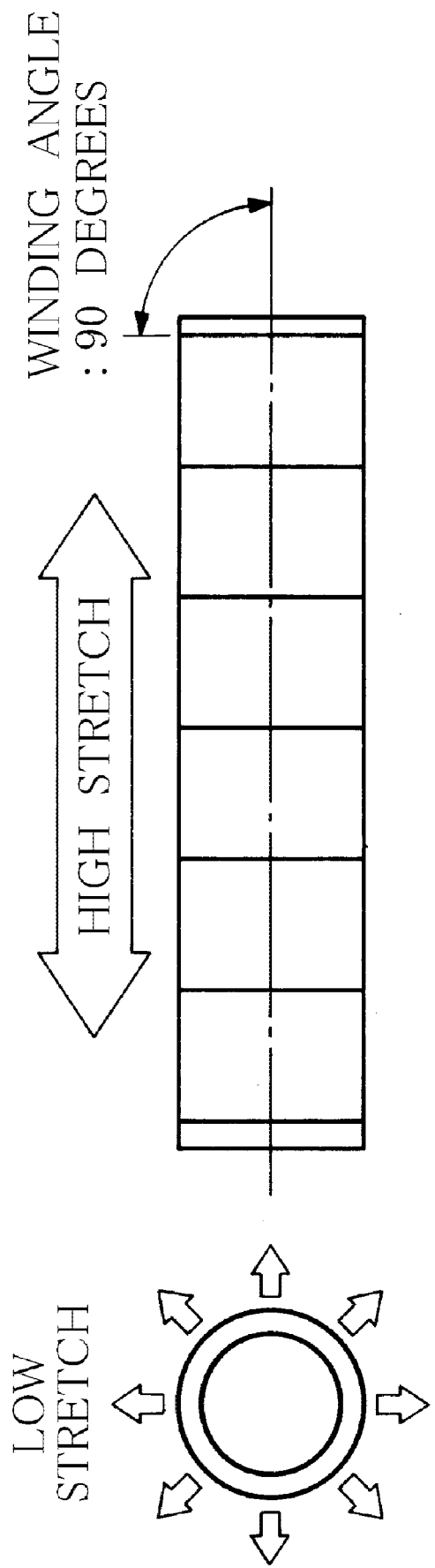
FIG. 2 is a simplified diagram of stretching of the vessel in a case in which the winding angle (fiber angle) of the helical layer is close to 90 degrees.
Figure 3:
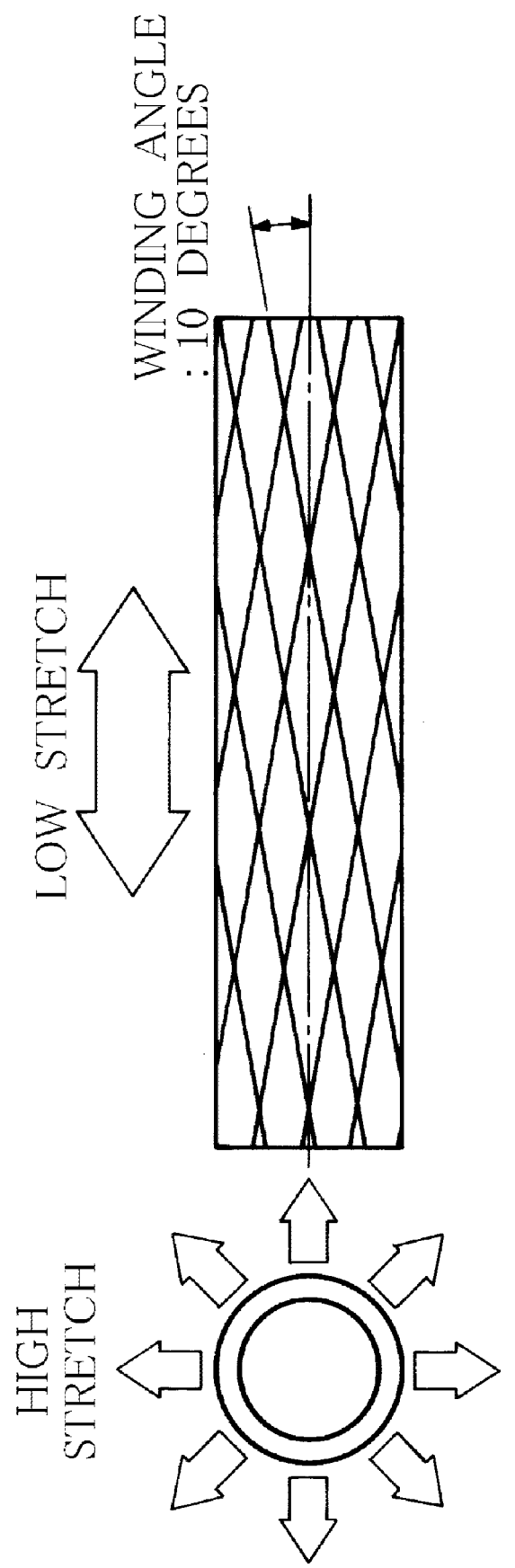
FIG. 3 is a simplified diagram of stretching of the vessel in a case in which the winding angle (fiber angle) of the helical layer is close to 0 degrees.
Figure 4:
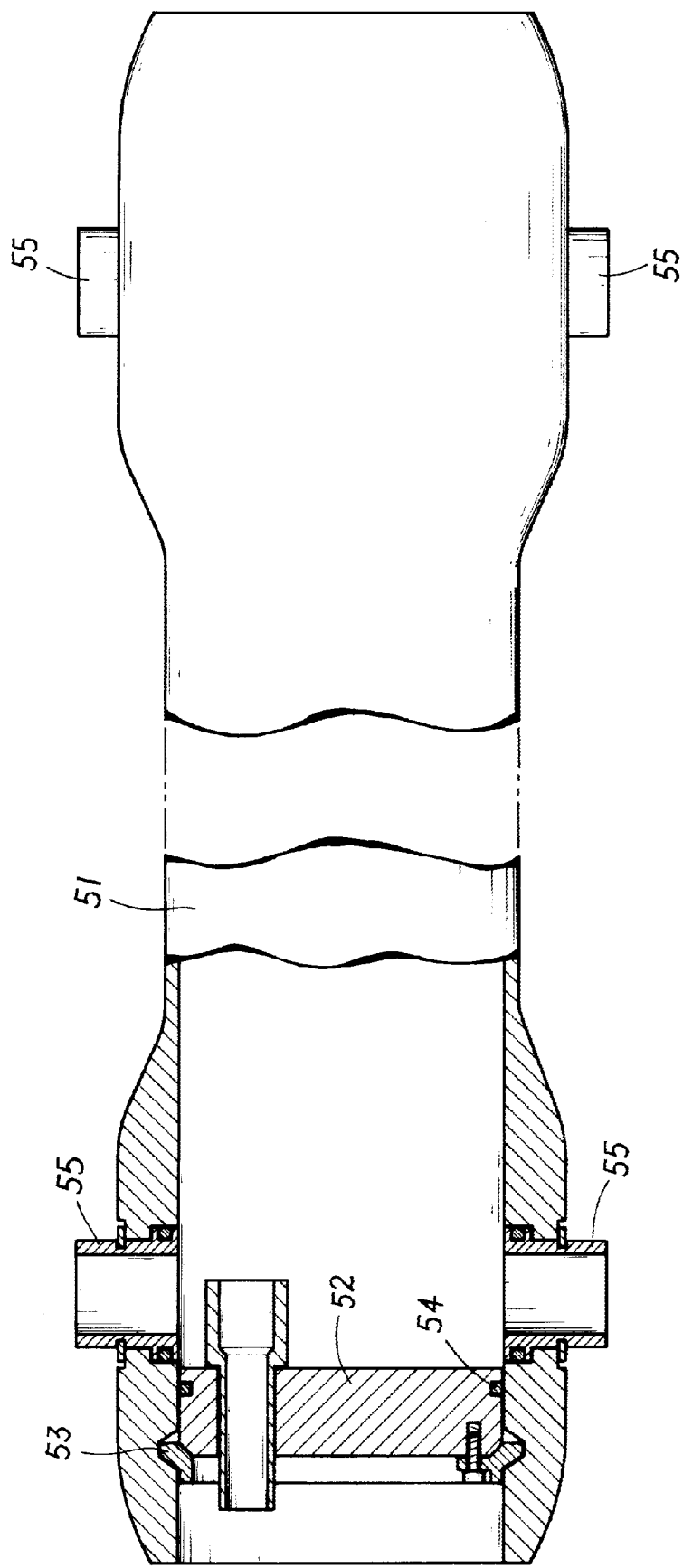
FIG. 4 is a simplified illustrative side view in which the pressure vessel is partially cut away.
Figure 5:
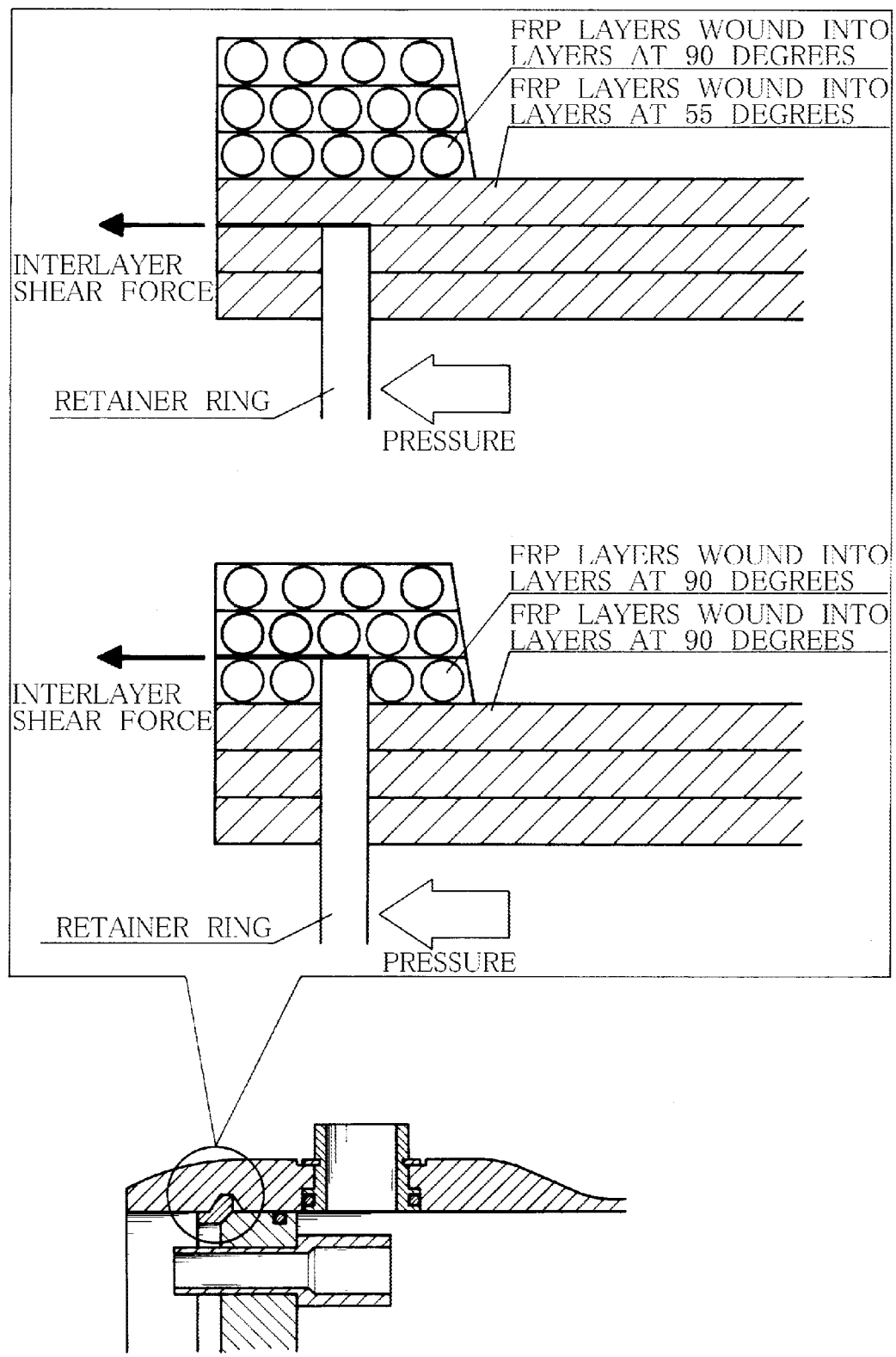
FIG. 5 is a simplified diagram of the location of a retaining ring, and the location to which interlayer shear force is directed.
Figure 6:
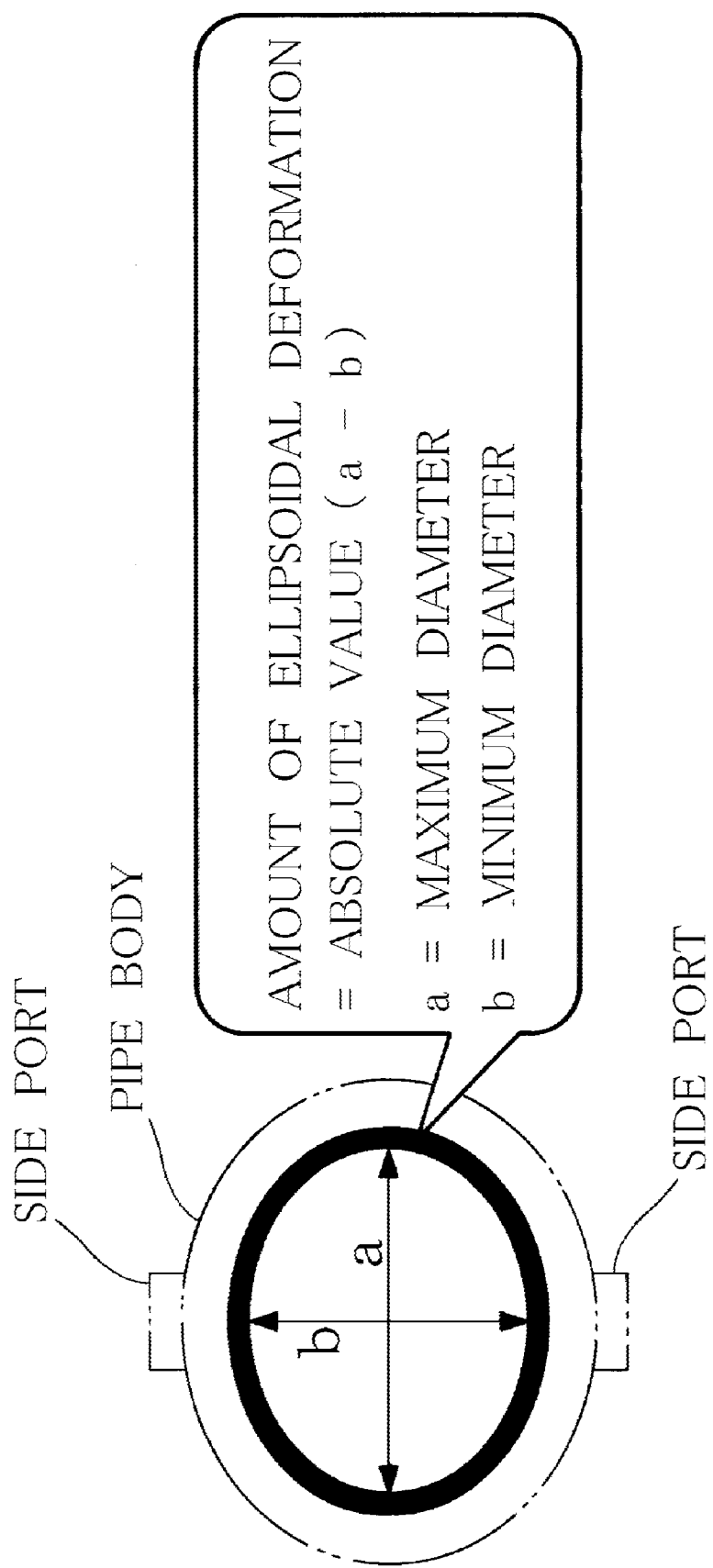
FIG. 6 is a simplified illustrative drawing relating to ellipsoidal deformation.

FIGS. 11 to 13 show results of individual measurements of the amount of ellipsoidal deformation, for Test Examples 1 to 3 similar in structure to the embodiment discussed above but in which the individual pipe bodies have different inside diameters, and for Comparative Examples 1 to 3 of conventional structure lacking a divergent part, like that illustrated in FIG. 2 of the aforementioned Patent Document 1. The permissible value of the amount of ellipsoidal deformation with respect to leakage is 0.4 mm. As shown in FIG. 6, the amount of ellipsoidal deformation is calculated as the absolute value of (a–b).

From FIGS. 11 to 13, it was verified that whereas the permissible value of the amount of ellipsoidal deformation was exceeded in all of the comparative examples lacking the structure of the present embodiment, all of the test examples were below the permissible value, were extremely resistant to ellipsoidal deformation, and had excellent waterproof properties.

The invention claimed is:

1. A pressure vessel for use in seawater desalination or water purification by reverse osmosis, comprising:
   a pipe body;
   an occluding cover at each end in the axial direction of the pipe body, for occluding the pipe body;
   inflow/outflow parts provided at a peripheral surface of the pipe body at a location inward from the occluding covers in the pipe body axial direction, wherein the inflow/outflow parts are configured for fluid to flow in or out from the peripheral surface of the pipe body,
   wherein the pipe body comprises:
      a helical layer consisting of helically winded fibers,
      hoop layers consisting of hoop wound fibers, and
      a seal layer as the innermost layer,
      the helical layer including, at each end in the axial direction of the pipe body, a divergent part diverging outward from the seal layer in the circumferential direction and extending from at least a location outward from the occluding cover in the pipe body axial direction to a location inward from the inflow/outflow part in the pipe body axial direction,
      the hoop layers including a first hoop layer disposed between the seal layer and the divergent part of the helical layer, and a second hoop layer disposed at the outer circumference of the helical layer, and extending from a location outward from the occluding cover in the pipe body axial direction to a location inward from the inflow/outflow part in the pipe body axial direction.

2. The pressure vessel according to claim 1, wherein the seal layer comprises a base material having a randomly isotropic fiber orientation, and a matrix resin identical to the matrix resin of the helical layer and the hoop layers.

3. The pressure vessel according to claim 2, wherein the resin content of the seal layer is greater than the resin content of the helical layer and the hoop layers.

4. The pressure vessel according to claim 3, wherein the resin content of the seal layer is set to 40-85 wt %, and the resin content of the helical layer and the hoop layers is set to 20-30 wt %.

5. The pressure vessel according to claim 2, wherein the seal layer includes a layer comprising a glass nonwoven and the matrix resin.

6. The pressure vessel according to claim 2, wherein the seal layer is constituted by a first seal layer comprising a glass nonwoven and the matrix resin, and a second seal layer comprising a polyester nonwoven and the matrix resin.

7. The pressure vessel according to claim 2, wherein the seal layer is a continuously winded tape on a mandrel.

8. The pressure vessel according to claim 5, wherein the seal layer is continuously winded tape on a mandrel.

9. The pressure vessel according to claim 6, wherein the seal layer is a continuously winded tape on a mandrel.

10. The pressure vessel according to claim 1, wherein the helical layer, in sections thereof other than the divergent part, contacts the seal layer.

11. The pressure vessel according to claim 5, wherein the helical layer, in sections thereof other than the divergent part, contacts the seal layer.

12. The pressure vessel according to claim 6, wherein the helical layer, in sections thereof other than the divergent part, contacts the seal layer.

13. The pressure vessel according to claim 7, wherein the helical layer, in sections thereof other than the divergent part, contacts the seal layer.

14. The pressure vessel according to claim 8, wherein the helical layer, in sections thereof other than the divergent part, contacts the seal layer.

15. The pressure vessel according to claim 9, wherein the helical layer, in sections thereof other than the divergent part, contacts the seal layer.

\* \* \* \* \*